(12) United States Patent
Crolene et al.

(10) Patent No.: US 9,594,805 B2
(45) Date of Patent: Mar. 14, 2017

(54) SYSTEM AND METHOD FOR AGGREGATING AND INTEGRATING STRUCTURED CONTENT

(75) Inventors: David Crolene, Flower Mound, TX (US); George Hitchcock, Dallas, TX (US); Mike Klinkenberg, Southlake, TX (US); Randy Matthews, Grapevine, TX (US); Eric Felice, Irving, TX (US)

(73) Assignee: Teradata US, Inc., Dayton, OH (US)

( * ) Notice: Subject to any disclaimer, the term of this patent is extended or adjusted under 35 U.S.C. 154(b) by 527 days.

(21) Appl. No.: 13/571,465

(22) Filed: Aug. 10, 2012

(65) Prior Publication Data

US 2012/0303575 A1 Nov. 29, 2012

Related U.S. Application Data

(62) Division of application No. 10/462,872, filed on Jun. 17, 2003, now abandoned.

(51) Int. Cl.
*G06F 7/00* (2006.01)
*G06F 17/30* (2006.01)

(52) U.S. Cl.
CPC .............................. *G06F 17/30489* (2013.01)

(58) Field of Classification Search
CPC ......... G06F 17/30864; G06F 17/30867; G06F 17/30067; G06F 17/30011; G06F 17/30592; G06Q 30/02; G06Q 10/10; G06Q 10/06; G06Q 10/00
USPC ................................................. 707/705, 603
See application file for complete search history.

(56) References Cited

U.S. PATENT DOCUMENTS

| | | | |
|---|---|---|---|
| 5,692,181 A * | 11/1997 | Anand et al. ................. | 707/714 |
| 5,710,900 A * | 1/1998 | Anand et al. ................. | 715/764 |
| 5,832,496 A * | 11/1998 | Anand et al. | |
| 5,870,746 A * | 2/1999 | Knutson et al. | |
| 5,884,310 A * | 3/1999 | Brichta et al. | |
| 6,282,537 B1 * | 8/2001 | Madnick et al. ............. | 707/716 |
| 6,604,110 B1 * | 8/2003 | Savage et al. ................ | 707/602 |
| 6,775,675 B1 * | 8/2004 | Nwabueze et al. ........... | 707/600 |
| 6,959,339 B1 * | 10/2005 | Wu et al. ...................... | 709/246 |
| 7,017,183 B1 * | 3/2006 | Frey et al. ........................ | 726/5 |
| 7,194,483 B1 * | 3/2007 | Mohan et al. ................ | 707/600 |
| 7,219,351 B2 * | 5/2007 | Bussler et al. ................ | 719/313 |
| 2002/0038335 A1 * | 3/2002 | Dong et al. ................... | 709/203 |
| 2003/0058277 A1 * | 3/2003 | Bowman-Amuah ......... | 345/765 |
| 2003/0135827 A1 * | 7/2003 | Kanzler et al. ............... | 715/522 |
| 2004/0068568 A1 * | 4/2004 | Griffin et al. ................. | 709/227 |
| 2004/0076941 A1 * | 4/2004 | Cunningham et al. ....... | 434/350 |

(Continued)

*Primary Examiner* — Robert Beausoliel, Jr.
*Assistant Examiner* — Michael Pham
(74) *Attorney, Agent, or Firm* — James Stover

(57) ABSTRACT

The present invention provides a centralized system and method for accessing, organizing, personalizing, and managing structured content located in disparate structured content systems. Structured content embedded within a particular system may be organized with structured content from other structured content systems. A processing module accesses the structured content located in the structured content systems using a conduit application programming interface. The processing module uses a display application programming interface to communicate with requesting systems. Metadata regarding the structured content is stored in a repository and the structured content may be used and viewed on a plurality of requesting systems.

10 Claims, 11 Drawing Sheets

(56) References Cited

U.S. PATENT DOCUMENTS

2004/0138933 A1* 7/2004 LaComb et al. .................. 705/7
2004/0215551 A1* 10/2004 Eder .............................. 705/38
2004/0215635 A1* 10/2004 Chang et al. ................. 707/100

* cited by examiner

TO Fig. 5b

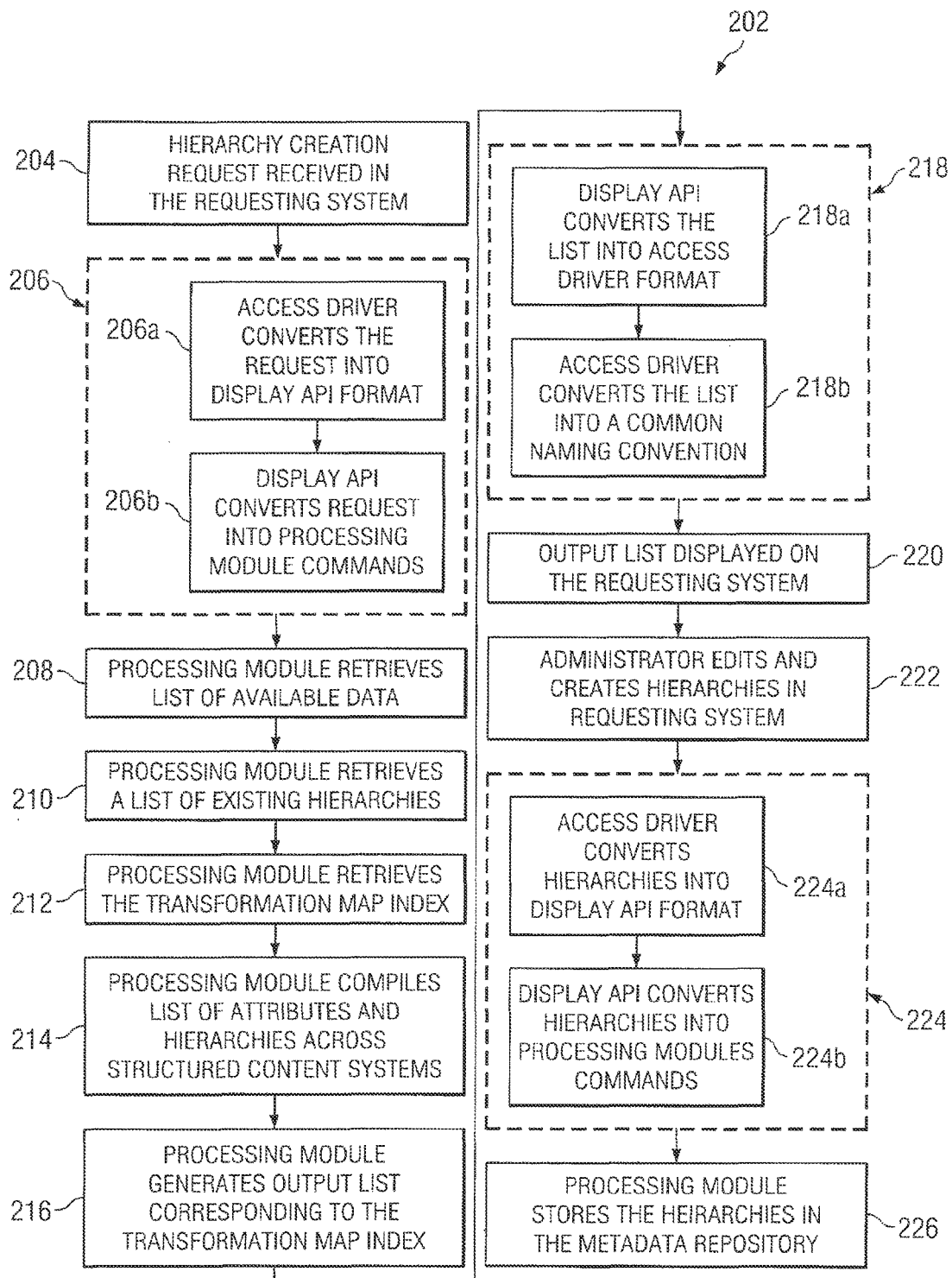

SYSTEM AND METHOD FOR AGGREGATING AND INTEGRATING STRUCTURED CONTENT

CROSS REFERENCE TO RELATED APPLICATIONS

This application is a divisional application of U.S. patent application Ser. No. 10/462,872; entitled "SYSTEM AND METHOD FOR AGGREGATING AND INTEGRATING STRUCTURED CONTENT" by David Corlene, George Hitchcock, Mike Klinkenberg, Randy Matthews, and Eric Felice; filed on Jun. 17, 2003 now abandoned.

FIELD OF THE INVENTION

The present invention is generally directed to aggregating and integrating structured content as defined and generated by structured content systems. More particularly, the present invention is directed to aggregating and integrating structured content that is embedded in multiple, disparate structured content systems, to provide the enterprise or business organization with a combined view of structured content available across a plurality of structured content systems.

BACKGROUND

The advent of the information age has resulted in systems of automation and a variety of software applications for major business functions such as accounting, payroll, sales, manufacturing, logistics, and so on. Over time, each of these applications generates a tremendous amount of data, information and content within the business context of the particular application. The content within each of these applications may be classified as unstructured and structured content.

Unstructured content is essentially data or files without an organizational structure that defines the content. Common examples of unstructured content include text documents, images, presentation materials, drawings, email, video and audio files.

Structured content is data transformed through a series of business rules, programming logic, and organizational constructs as defined by an authoring application. Structured content is often a virtual, logical representation of content that is not physically stored on a network, but rather instantiated by an application upon request. While unstructured content is typically exposed and registered in file directories for users and applications to search and access, structured content is typically embedded within an application lying behind proprietary, application-specific schemes and mechanisms for defining, accessing, organizing and displaying content. Because structured content is embedded within each corresponding application, it is difficult to list, organize and access structured content in a combined view. Examples of applications generating structured content include customer relationship management (CRM) software, enterprise resource planning software, supply chain management software, general ledger/financial software, human resources software, and reporting software.

A specific class of applications devoted to creation and management of structured content are business intelligence systems. Business intelligence systems represents a class of software products that transform data into structured content to assist individuals, such as employees, in the discovery of trends, patterns, and associations to better understand operations, opportunities, and market trends. Business intelligence software products currently utilize different architectures, application logic, business rules, and security mechanisms for generating structured content.

Because different structured content applications have different features and functionality, many enterprises deploy a "best of breed" approach by installing specialized applications that handle a specific group of business processes.

However, current structured content systems utilize a unique, proprietary security and access mechanism, and generate structured content according to the unique business rules, features, and data available in the context of the application. The "learning curve" required to proficiently utilize each system can be high. This often results in an inability or reluctance by the knowledge workers to utilize the full data resources within the enterprise.

Enterprises have therefore become frustrated with the inability to locate, access, and align structured content to business processes, and analytic thought processes necessary to work more effectively and efficiently. For example, sales information may be available within application "A," inventory information is only available in application "B," and costs may be accessible only in application "C." In essence, each application has imposed an architectural and contextual boundary to the structured content offered. Therefore, an employee needing all three types of structured content must know where to find each application, remember multiple passwords, locate the appropriate structured content within the application, and switch between the different application interfaces to use the content. Furthermore, if an employee intends to integrate the information into one report or view, the employee would have to export the information out of each system and bring it into some common format (e.g., a spreadsheet) and then generate rules to integrate the information (e.g., formulas in a spreadsheet).

SUMMARY OF INVENTION

The present invention provides a system and method for aggregating and integrating structured content. In one embodiment of the invention for aggregating structured content, one of a plurality of structured content systems is accessed using a conversion module. Structured content contained in at least one of the plurality of structured content systems is selected, and data elements within the at least one of the plurality of structured content systems are identified. A hierarchy of the data elements is identified, and parameters that define the selected structured content are retrieved. The data elements, the hierarchy, and parameters that define the selected structured content are retrieved and the parameters are stored in a metadata repository.

In another embodiment for aggregating structured content, navigation commands are received from a requesting system and system access parameters for accessing at least one of the plurality of structured content systems are retrieved. At least one of the plurality of structured content systems is navigated based on the navigation commands, and one of a plurality of structured content systems is accessed using a conversion module. Structured content contained in at least one of the plurality of structured content systems is selected, and data elements within the at least one of the plurality of structured content systems are identified. A hierarchy of the data elements is identified, and parameters that define the selected structured content are retrieved. The data elements, the hierarchy, and parameters that define the selected structured content are retrieved and the parameters are stored in a metadata repository. Each of the foregoing is repeated for a plurality of structured content contained in the plurality of structured content systems.

In a further embodiment for accessing structured content, a request for structured content is received from one of a plurality of requesting systems. A first plurality of structured content parameters are obtained from a metadata repository, wherein the first plurality of structured content parameters define structured content in a first one of a plurality of structured content systems and wherein the metadata repository contains a second plurality of structured parameters that define structured content contained in a second one of the plurality of structured content systems. The structured content parameters are submitted through an API to a communications driver in communication with one of the plurality of structured content systems, and structured content output is received based on the submitted structured content parameters.

In another embodiment for integrating structured content, a list of data elements from at least one of a plurality of structured content systems is generated. A transformation index is generated based on the data elements, and a list of hierarchies is generated based on the data elements that span one or more structured content systems.

In an additional embodiment, a system for processing structured content in a plurality of structured content systems comprises an access driver in communication with at least one requesting system. A content driver is in communication with one of the plurality of structured content systems, and a processing module in communication with the access driver and the content driver for identifying data elements within one of the plurality of structured content systems and identifying at least one hierarchy of the data elements. A first conversion module is in communication with the access driver and the processing module and converts information sent to and from the access driver and the processing module. A second conversion module is in communication with the processing module and the content driver and converts information sent to and from the processing module and the content driver. A metadata repository stores a plurality of metadata objects created by the processing module.

BRIEF DESCRIPTION OF THE DRAWINGS

FIG. 9 is a flowchart illustrating the operation of an embodiment of the invention for creating hierarchies.

DESCRIPTION

The following disclosure provides many different embodiments, or examples, for implementing different features of a system and method aggregating and integrating structured content. Specific examples of components, processes, and implementations are described to help clarify the invention. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
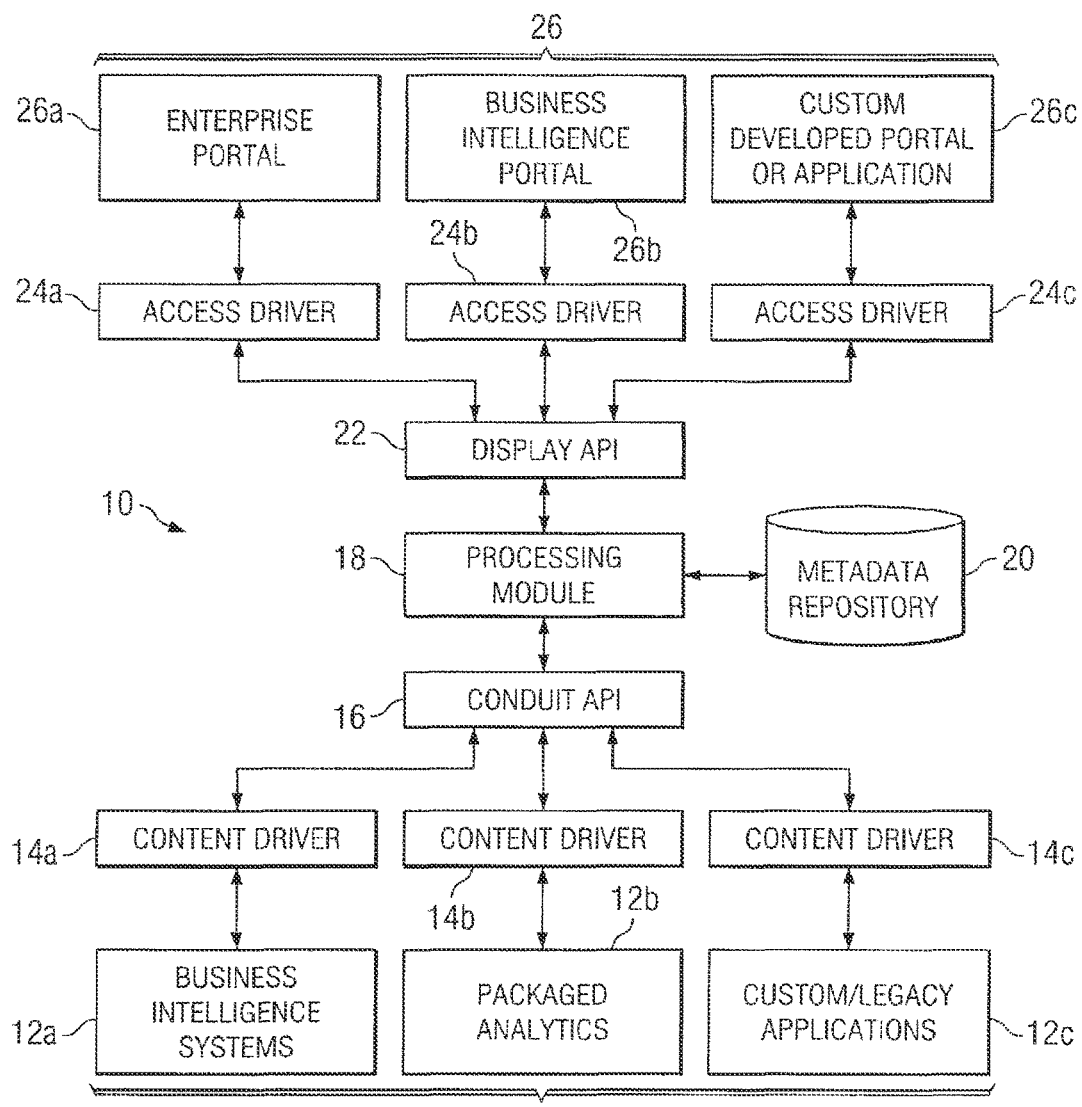
FIG. 1 is an illustration of an embodiment of the invention.

Referring to FIG. 1, one embodiment 10 of the system for aggregating and integrating structured content is shown. The structured content systems 12 are accessible to the system and may provide its own respective independent method (or methods) of navigating through the structured content. Some structured content systems 12 create structured content from raw data, while other structured content systems serves as repositories of structured content created by other systems or applications. Structured content systems generally comprise three categories: business intelligence systems, packaged analytic systems, and custom or legacy applications that provide reporting functionality. In this embodiment, one structured content system for each category is shown. However, it is understood that any combination of structured content systems (or other forms of content systems) could be used in the present invention.

The first structured content system in this embodiment is a business intelligence system 12*a*. The business intelligence system 12*a* is a structured content system that transforms data into structured content that may be business views to assist individuals, such as employees, in the discovery of trends, patterns, and associations to analyze operations, opportunities, and market trends. Certain business intelligence systems allow companies to gain access to data stored across multiple data sources. Business intelligence software products currently utilize different architectures and approaches for defining information, storing combined views of the business, accessing the raw data, and administering security. Examples of business intelligence systems might include software systems from Cognos, Business Objects, SAS, and Hyperion.

The second structured content system in this embodiment is a packaged analytic system 12*b*. The packaged analytic system 12*b* is a reporting architecture created for active reporting of data within specific applications and their business function domain. Packaged analytics often serve as the reporting and analysis components to broad-reaching business software suites such as customer relationship management software (CRM) software, enterprise resource planning (ERP) software, supply chain management software, general ledger/financial software, and human resources software. Packaged analytics also produce structured content for data within their application's business function domain. Examples of packaged analytic systems might include software systems from PeopleSoft, SAP, and Siebel.

The third structured content system in this embodiment is a custom or legacy application that provides reporting functionality 12*c*. Examples of applications that provide reporting functionality include a custom written inventory application or a mainframe customer call tracking application. In addition, the system 10 could also access unstructured content, which might include files created or usable by Microsoft Excel, Microsoft Word, Adobe Acrobat, as well as unstructured information such as text files, email, audio, video, web links, and other forms of electronic information. In some embodiments, the unstructured content may be managed by an unstructured content management system (such as a document management software program).

Each structured content system 12 is in communication with a content driver 14a, 14b, and 14c. In certain embodiments, a content driver 14 may be integrated into a structured content system 12. The content drivers 14 are in communication with the processing module 18 via the conduit application programming interface (conduit API) 16. The content drivers 14 serve as a translation layer between the communication conventions used by the applicable structured content systems 12 and the convention used by the conduit API 16. Typically there exists a unique structured content access driver 14 for each specific structured content system 12; however, if multiple structured content systems utilize the same communication convention, a single content driver could be used for those structured content systems.

The conduit API 16 is in communication with the processing module 18 and facilitates two-way communication between the processing module 16 and the content drivers 14 for the structured content systems 12. This conduit API 16 uses series of standardized procedures, thus providing a single framework that any content driver 14 can use to communicate with the processing module 18. This enables additional structured content systems 12 to be added to the system 10 without modifying the processing module 18.

The processing module 18 processes the requests from users and acts as the interface between the requesting system 32, the metadata repository 20, and the structured content systems 12 and facilitates accessing, aggregating, and integrating structured content. The processing module 18 may also handle actions such as searching, security management, session management, transaction governing, usage tracking, administration, caching, and alert monitoring, as well as associating disparate structured content, managing requests to and from the structured content, and generating presentation output. Aggregation of structured content, as more fully described herein, may identify and map granular information from each structured content system and compile it into a common view that is organized and displayed independent of the underlying systems. As an example, structured content system "A" might arrange a list of financial reports alphabetically and structured content system "B" might arrange financial reports by geographic region. Aggregation allows a user to access a single common interface and open a folder (e.g. "Finance"). Within the "Finance" folder, the user may then review a General Ledger Report, which originates from system A, and a Profit and Loss Report, which originates from System B. In this manner, knowledge workers would be able to efficiently and easily obtain such access to structured content from multiple structured content systems.

The metadata repository 20 is a database platform that contains information and parameters for use by the processing module 18. The metadata repository 20 contains metadata that represents the connection and communication parameters to be used to initiate requests into the structured content systems 12, and the connection and communication parameters to be used to respond to requests from the requesting systems 26. The metadata repository may also contain the user security information and other settings necessary for the operation of the processing module 18, and may also contain parameters with respect to unstructured content. Examples of metadata may include structured content location (such as a particular computer server and its network address), report names (e.g., "Corporate Budget 2003"), report descriptions (e.g., "A detailed analysis of the expected expenditures during fiscal year 2003"), report display properties (e.g., grid or graph display mode) as well as user names and user access privileges for any or all of the structured content systems 12. The processing module 18 may access the metadata repository 20 via database connectivity.

The display application programming interface (display API) 22 communicates with the processing module 18 and facilitates communication between the processing module 18 and the requesting systems 26. This display API 22 uses series of standardized procedures, thus providing a single framework that any access driver 24 can use to communicate with the processing module 18. This enables additional requesting systems 26 to be added to the system 10 without modifying the processing module 18.

The access drivers 24 allow each requesting system 32 to communicate with the display API 28. Each access driver 24 acts as a translation layer between a corresponding requesting system's communication conventions and the convention used by the display API 22. Typically, there exists a unique access driver 24 for each requesting system 26. Often, an access driver 24 may be integrated into a requesting system 26.

The requesting systems 26 are the systems with which the individual or individuals request reports, information, and data. However, it is possible that a requesting system 26 may be automated or function with batch processing to create requests. Requesting systems 26 generally comprise three categories. In this embodiment, one requesting system for each category is shown. However, it is understand that any combination of requesting systems could be used in the present invention.

The first requesting system in this embodiment is an enterprise portal 26a. The enterprise portal 26 is a requesting system that allows individuals to access information necessary, regardless of where the underlying data is located or the type of system that is housing the data. In one embodiment, the enterprise portal is browser-based and could be implemented on any node, such as a personal computer, personal digital assistant, mobile phone, or any similar device.

The second requesting system in this embodiment is a business intelligence portal 26b. The business intelligence portal 26b is a requesting system that has the ability to support analytics, unstructured information and rudimentary portal functionality.

The third requesting system in this embodiment is a custom developed portal or application 26c. The custom developed portal or application 26c is a requesting system that was created to enable an individual or company to consolidate information into a single point of access or generate a custom application to support a user's needs. In either case, it may include functionality from multiple types of requesting systems.

Figure 2:
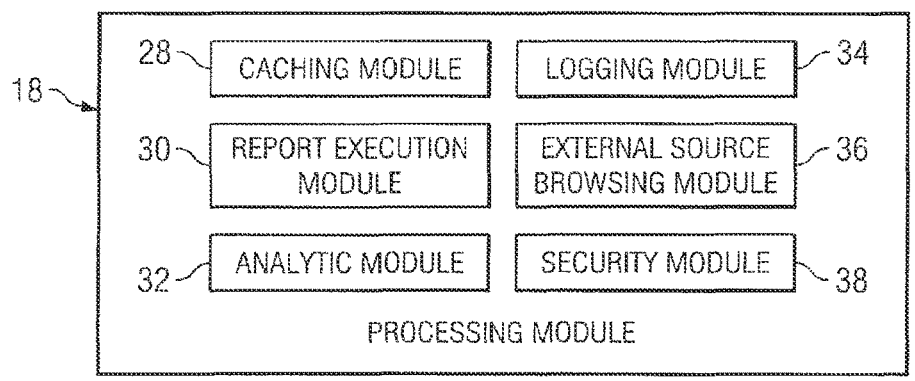
FIG. 2 is an illustration of an embodiment of the processing module.

Referring to FIG. 2, an example embodiment of the processing module 18 is shown. In this embodiment, the processing module 18 is comprised of a caching module 28, a report execution module 30, an analytic module 32, a logging module 34, an external source browsing module 36, and a security module 38.

The caching module 28 is used to cache metadata objects and structured content objects that result from user requests, and is often used to enhance the performance and functionality of the system. Frequently requested metadata or structured content, or a logical pointer to such information, could be located in the caching module 28. In one embodiment, the caching module 28 is a file-based repository to improve performance for highly iterative transactions. The caching module 28 can be configurable and may be tuned for different degrees of metadata caching Some of the configurations options available for metadata caching are duration, amount of memory allotted for cache, number of nodes of a hierarchy to store in cache, and number of object parameters to cache. In addition to metadata, the caching module 28 may be a repository of structured content output in the form of results (e.g., data) and their corresponding structures (e.g., metadata). This "structured result" is used for functionality such as pre-cached structured content access, multi-report result merging, search, alerting, and interrelating cached results. In a further embodiment, the processing module may send alerts to a requesting system based on metrics within structured content cached results. The processing module 18 analyzes the caching module 28 and compares specific metric values to user-defined thresholds that are stored in metadata repository 20 (FIG. 1). Different alerts may be made available based on the type of data contained in the structured content systems.

The report execution module 30 manages the submission and management of accessing structured content objects through the system. A structured content object is a specific structured content item, e.g., a sales report. The report execution module 30 manages a connection to the metadata in the metadata repository 20 (FIG. 1) and/or caching module 28 to retrieve all pertinent parameters necessary to execute a structured content object. The report execution module 30 manages the process of either executing the necessary commands against the underlying structured content system to retrieve the structured content object or accessing a pre-cached structured content object from the caching module. The report execution module 30 also manages the communication with the caching module 28 and logging module 34. Results can also be generated based on search parameters. The searching aspect of the processing module enables a user to search for structured content across multiple structured content systems 12 (FIG. 1).

The analytic module 32 primarily manages integration functionality for the processing module 18. The analytic module 32 receives input from both administrators and users to map structured content objects across structured content systems (e.g., "Y" in a first structured content system is equivalent to "YR" in a second structured system which is treated as "Year" by the processing module 18), to edit hierarchies (e.g., Year is a parent of Month in a first and second structured content system, but in a third structured content system there is no Month), to generate rules (e.g., in a first structured content system, the "Year" starts two months later than the "Year" in a second structured content system because of fiscal year considerations). The analytic module 32 may also receive input to combine data attributes (e.g., year, region, item) with metrics (e.g., sales, inventory) and generate a new report, as well as input to link from one report to another report based on underlying established hierarchies. For example, a user may be viewing a report contained in a first structured system that has Year, Region, and Sales. The user chooses to view more information on a particular Year. If the first structured system cannot support the request, the analytic module 32 may request a report from a second structured content system that has Month, Region, and Sales.

The logging module 34 allows the system to track user activity and errors. Logging may be written to either a relational database or a file-based repository. The logging module 34 may be a stand-alone separate process server that receives requests from the processing module 18 and then processes the request based on the type of request. There are many types of requests for the logging module 34, including critical error logging, configurable tracing, usage tracking, and history tracking. Critical error logging is when a component of the processing module 18 or other module fails to operate as designed. Configurable tracing allows a user to log the processes that take place during operation, and may allow a user to configure the degree or granularity of the processes that are traced. Usage tracking tracks usage of the system, such as usage analysis, user and user group analysis, administrative activity, usage trends, as well as other statistics that are readily known to those skilled in the art. History tracking is short-term usage logging that allows for historical reference by a user to keep track of what actions that user has undertaken in the system.

The external source browsing module 36 communicates with the structured content systems 12 (FIG. 1) and facilitates navigation of the navigable structures available within a structured content system. In one embodiment, this module allows a user to navigate and define external structured content to the processing module 18. As an example, an administrator may want to add "report a" from "structured content system 1" for display to an end-user. Through an administrative user interface, the administrator would choose "structured content system 1" from the list of available structured content systems. The administrator would then be allowed to navigate "structured content system 1" through a user interface that is the same for all structured content systems, and when the administrator selects "report a," the metadata for that report is stored in the metadata repository 20 (FIG. 1).

The security module 38 allows administrators to manage users and user groups and their authentication and security profiles within the system. An administrator may create and import users, map users to groups, assign logon credentials applicable to each structured content system, and define what privileges that user has on various functionality and structured content objects within the metadata repository.

Figure 3:
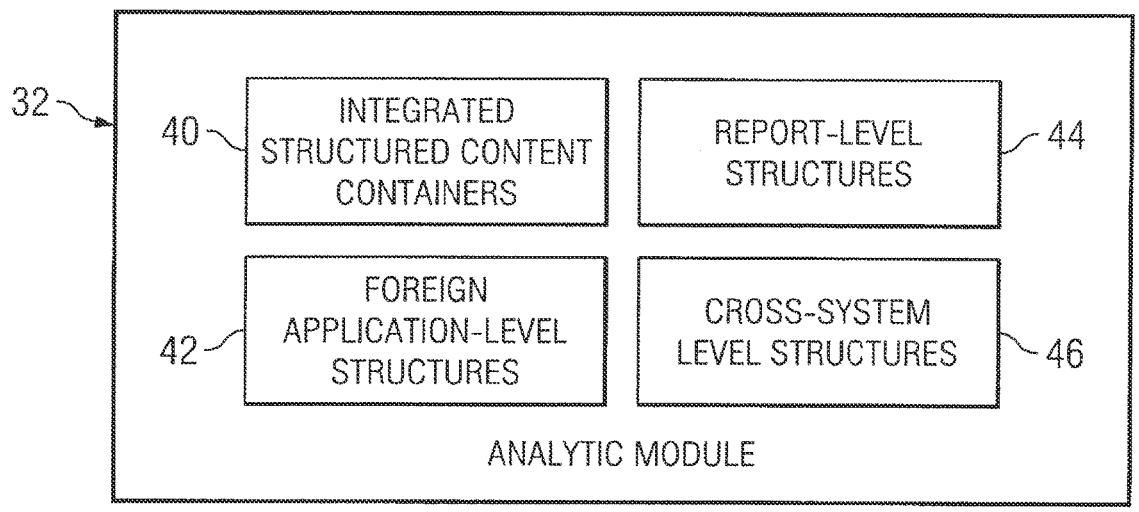
FIG. 3 is an illustration of an embodiment of the analytic module.

Referring to FIG. 3, an example embodiment of the analytic module 32 is shown. In this embodiment, the analytic module contains integrated structured content container module 40, foreign application-level structure module 42, report-level structure module 44, and cross-system level structure module 46.

The integrated structured content container module 40 generates structured content objects that are comprised of data components from underlying structured content objects. As discussed above, the analytic module 32 receives input from a user to create a new report based on underlying data structures and structured content objects within the defined structured content systems. After receiving that input, the integrated structured content container module sends the structured content container to the metadata repository 20 (FIG. 1) for storage. When the analytic module 32 receives a request to access an integrated structured content container, the integrated structured content container module 40 determines the underlying structured content objects that must be retrieved from the structured content systems 12 (FIG. 1). The integrated structured content container module may parse together a new result set based on the structure of the integrated structured content container.

The foreign application-level structures module 42 generates the metadata that represents hierarchical relationships between attributes within a single structured content system 12 (FIG. 1). For example, a first structured content system may have the relationship: Year is a parent of Month which is a parent of Day, and this relationship is used across all structured content contained in that structured content system. The foreign application-level structures module 42 stores the metadata representing those hierarchical relationships of the structured content systems in the metadata repository 20 (FIG. 1).

The report-level structures module 44 generates the metadata that represents hierarchical relationships between attributes within a single structured content object (e.g. a report). For example, a report in a first structured content system may enforce the relationship: Year is a parent of Month, which is a parent of Day. The report-level structures module 44 stores the metadata representing that hierarchical relationship for that report in the metadata repository 20.

The cross-system level structures module 46 generates the metadata that represents hierarchical relationships between attributes across multiple structured content systems. For example, a first structured content system and a second structured content system may both use the hierarchical relationship: Year is a parent of Month, which is a parent of Day. Since this hierarchical relationship is used across all reports within both structured content systems, the cross-system level structures module 46 generates metadata to represent that hierarchical relationship and that it is used in those particular structured content systems and stores that metadata in the metadata repository 20.

Figure 4:
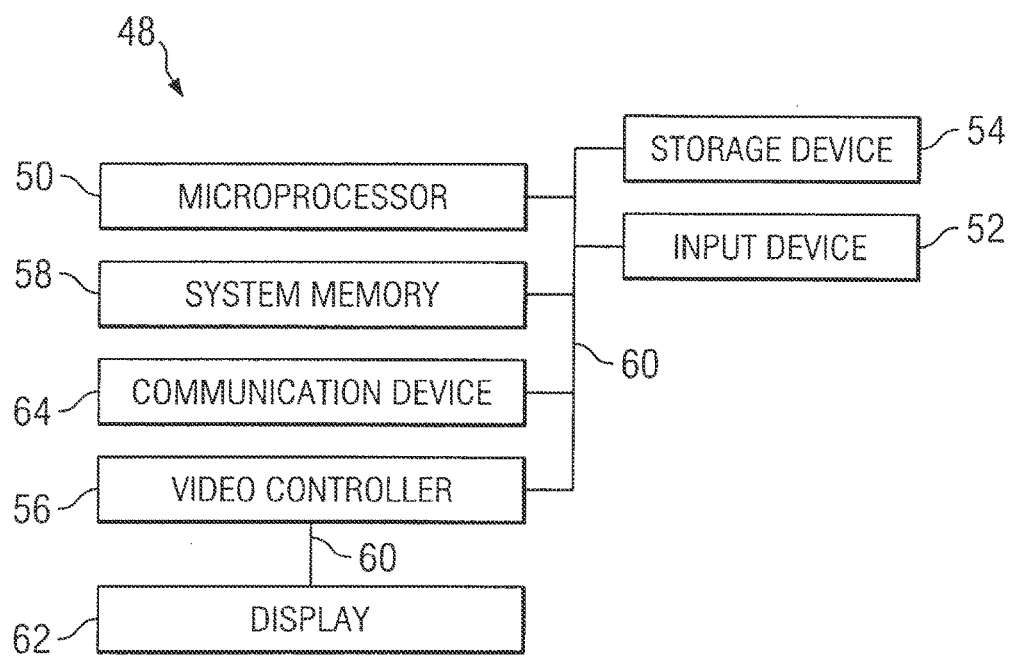
FIG. 4 is an illustration of a computer for use with one embodiment of the invention.

Referring to FIG. 4, an illustrative node 48 for implementing an embodiment of the method is depicted. Node 48 includes a microprocessor 50, an input device 52, a storage device 54, a video controller 56, a system memory 58, and a display 62, and a communication device 64 all interconnected by one or more buses 60. The storage device 54 could be a floppy drive, hard drive, CD-ROM, optical drive, or any other form of storage device. In addition, the storage device 50 may be capable of receiving a floppy disk, CD-ROM, DVD-ROM, or any other form of computer-readable medium that may contain computer-executable instructions. Further communication device 56 could be a modem, network card, or any other device to enable the node to communicate with other nodes. In certain embodiments, a node 48 could be used by a requesting system 26, processing module 18, or structured content systems 12 to run the disclosed system and method. It is understood that any node could represent a plurality of interconnected (whether by intranet or Internet) computer systems, including without limitation, personal computers, mainframes, PDAs, and cell phones.

Figure 5A:
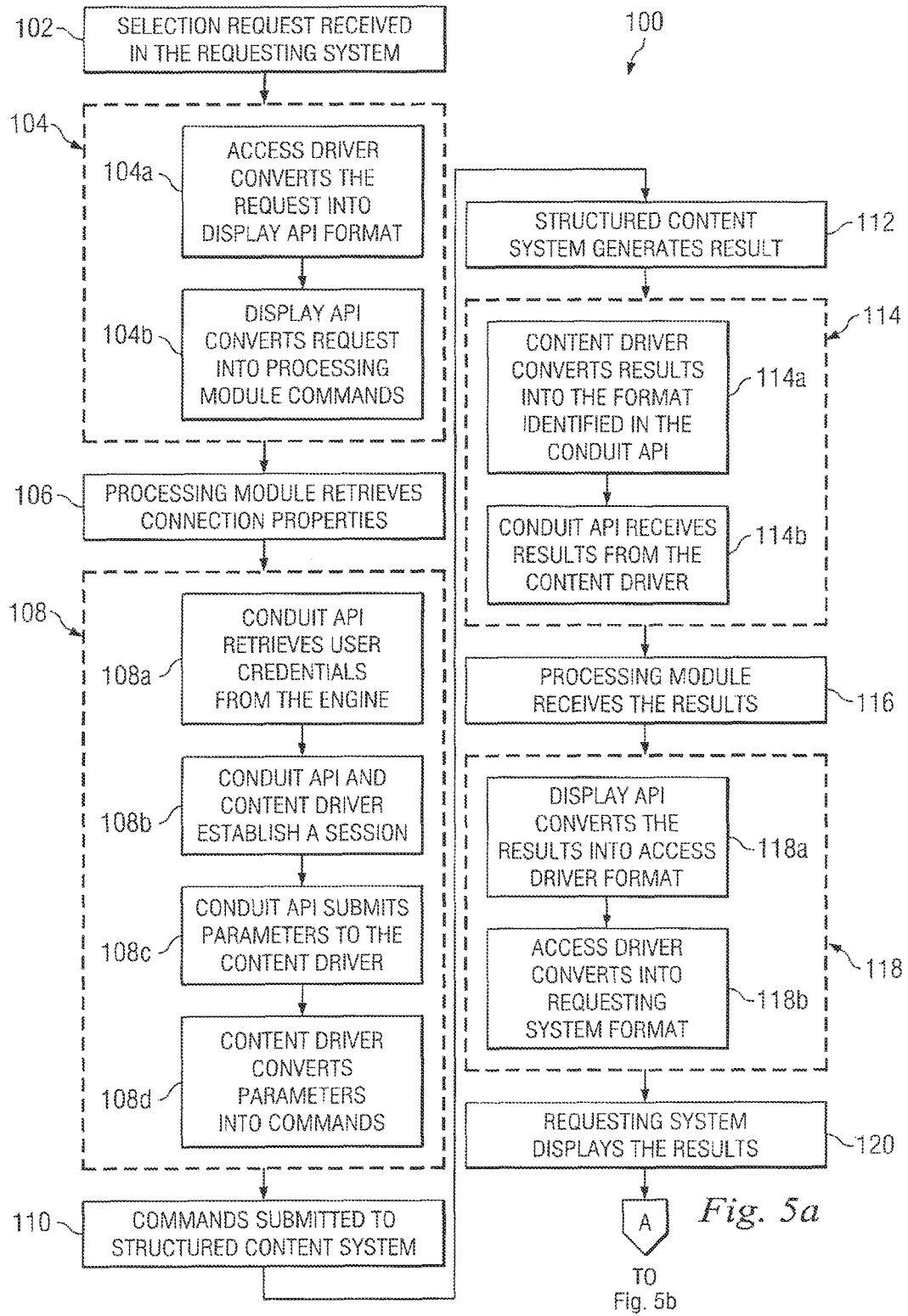
FIG. 5 is a flowchart illustrating the operation of an embodiment of the invention for aggregating structured content.

Referring now to FIG. 5, an example 100 of the operation of an embodiment of the invention for navigation of structured content within structured content systems in order to aggregate the structured content is shown. In step 102, a user makes a navigation request using a display environment. For example, a user might select a folder in which he wants to browse a particular set of reports. At step 104, the navigation request from the user is converted into commands to be executed by the processing module. In this embodiment, the conversion is executed by an access driver in communication with a display API. At step 104*a*, an access driver in communication with the requesting system converts the navigation request into the conventions for a display API. In step 104*b*, the display API creates a series of commands based on the request and sends those commands to the processing module. It is understood that other methods of converting the request into commands for the processing module could be used. In other embodiments, the requesting system could communicate directly with the processing module, with no conversion required.

At step 106, the processing module, based on the commands received, communicates with the metadata repository to retrieve the connection properties and system access parameters to connect to the external structured content system dictated by the user's selection. Connection properties might include: server name, port number, and administrative credentials, as well as other properties that might be used to connect with a particular structured content system. System access parameters typically include information necessary to create a session with a system, and examples might include user credentials and user timeout values. It is understood that for this step as well as others throughout this invention, these properties may be retrieved from a location other than the metadata repository such as from a file, from a hard-coded reference in the code base, or as a pass-through parameter from another system. Additionally, in other embodiments, the connection properties and system access parameters may be hard-coded into the system.

At step 108, the connection properties and system access parameters are used to create commands to be executed by a structured content system. In this embodiment, this conversion commences at step 108*a*, where a conduit API retrieves systems access parameters for accessing a structured content system from the processing module. At step 108*b*, the conduit API requests a communication session with a structured content driver in communication with the structured content system. At step 108*c*, the conduit API submits a request containing the system access command (e.g., open folder and return list of reports) and connection properties to the structured content driver. At step 108*d*, the structured content driver converts the system access command and connection properties into a set of commands that conform to the conventions of the structured content system. In one embodiment, the structured content driver may retain the parameters used to communicate with the underlying structured content system. It is understood that other methods of converting the properties and parameters for the structured content system could be used. In other embodiments, the processing module could communicate directly with the structured content system, with no conversion required.

At step 110, the converted commands are submitted to the structured content system. At step 112, the structured content system performs the commands and generates the results (e.g. a list of available reports). At step 114, the results are converted and sent to the processing module. In this embodiment, at step 114*a*, the structured content driver converts the results into the format required by the conduit API. At step 114*b*, the conduit API receives the results from the structured content driver and sends those results to the processing module. At step 116, the processing module receives the results.

At step 118, the results are converted into the conventions for the requesting system. In this embodiment, at step 118*a*, the results are converted by the display API into a format usable by the access driver. At step 118*b*, the access driver converts the results into the convention used by the requesting system. At step 120, the requesting system displays the results of the navigation request.

Figure 5B:
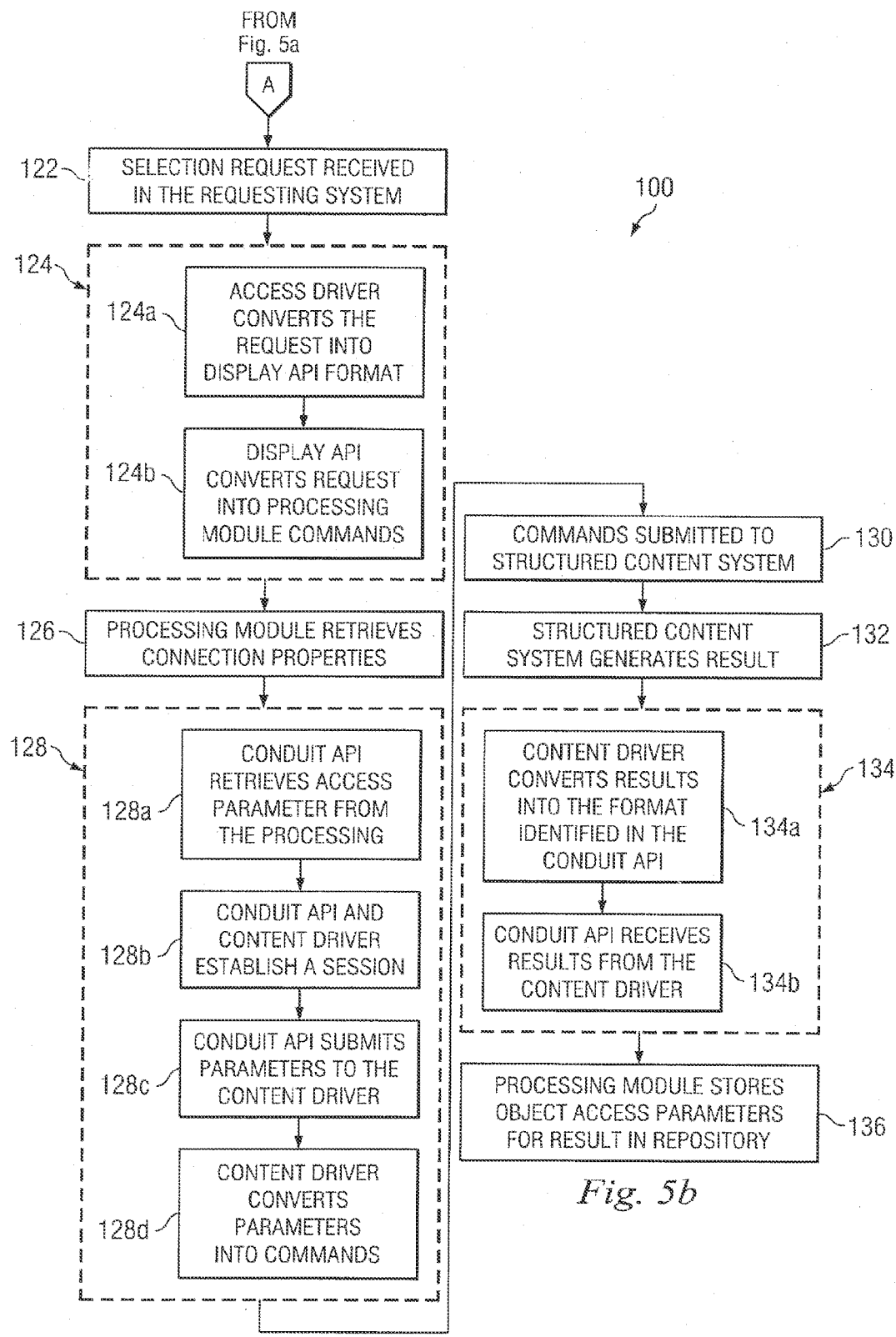

FIG. 5b refers to the operational flow of adding a structured content object reference to the metadata repository for later retrieval. At step 122, the user selects from the results a particular structured content object that is desired to be included in the metadata repository. The selection may include an object identifier that is either visible or invisible (e.g., as a link or link property) to the user. At step 124, the selection is converted into a format recognized by the processing module. In this embodiment, the selection is converted first by an access driver, at step 124a, and the converted again by a display API, at step 124b.

At step 126, the processing module retrieves the connection properties and system access parameters from the metadata repository for the structured content system containing the structured content selected by the user. At step 128, the connection properties and system access parameters are converted into commands to be executed by a structured content system. In this embodiment, this conversion commences at step 128a, where a conduit API retrieves system access parameters for accessing a structured content system from the processing module. At step 128b, the conduit API requests a communication session with a structured content driver that is in communication with the structured content system. At step 128c, the conduit API submits a request containing the connection properties as well as an object identifier to the structured content driver. At step 128d, the structured content driver converts the connection properties and object identifier into a set of commands that conform to the conventions of the structured content system. It is understood that other methods of converting the properties and parameters for the structured content system could be used. In other embodiments, the processing module could communicate directly with the structured content system, with no conversion required.

At step 130, the converted commands are submitted to the structured content system (e.g., retrieve the particular parameters for a report). An object identifier may be submitted to the structured content system to identify the structured content object. At step 132, the structured content system performs the commands and generates the results (object parameters). Object parameters might include: report name or identification, report display mode (such as if the report is a grid or a graph), prompt values, timeout, display interface (full-screen/frame), or other parameters that may be associated with a report or other structured content.

At step 134, the object parameters are converted and sent to the processing module. In this embodiment, at step 134a, the structured content driver converts the object parameters into the format required by the conduit API. At step 134b, the conduit API receives the results from the structured content driver and sends those object parameters to the processing module. At step 136, the processing module receives the results and writes the object parameters to the metadata repository for the selected object. In another embodiment, the processing module also updates the metadata object cache to reference the specified object returned in the results.

In this embodiment, a user is able to request additional structured content objects from a multitude of structured content systems, thereby generating aggregated reports, e.g., a centralized virtual location for reports or other structured content contained in the multiple structured content systems. However, while a human user has been discussed as providing inputs to the system, the system may also use "spiders" or "bots" modules, or other methods of automation, to navigate through the structured content systems and check for new structured content, or for structured content that has been modified. Modified structured content might include structured content that was updated, moved, or altered.

Figure 6:
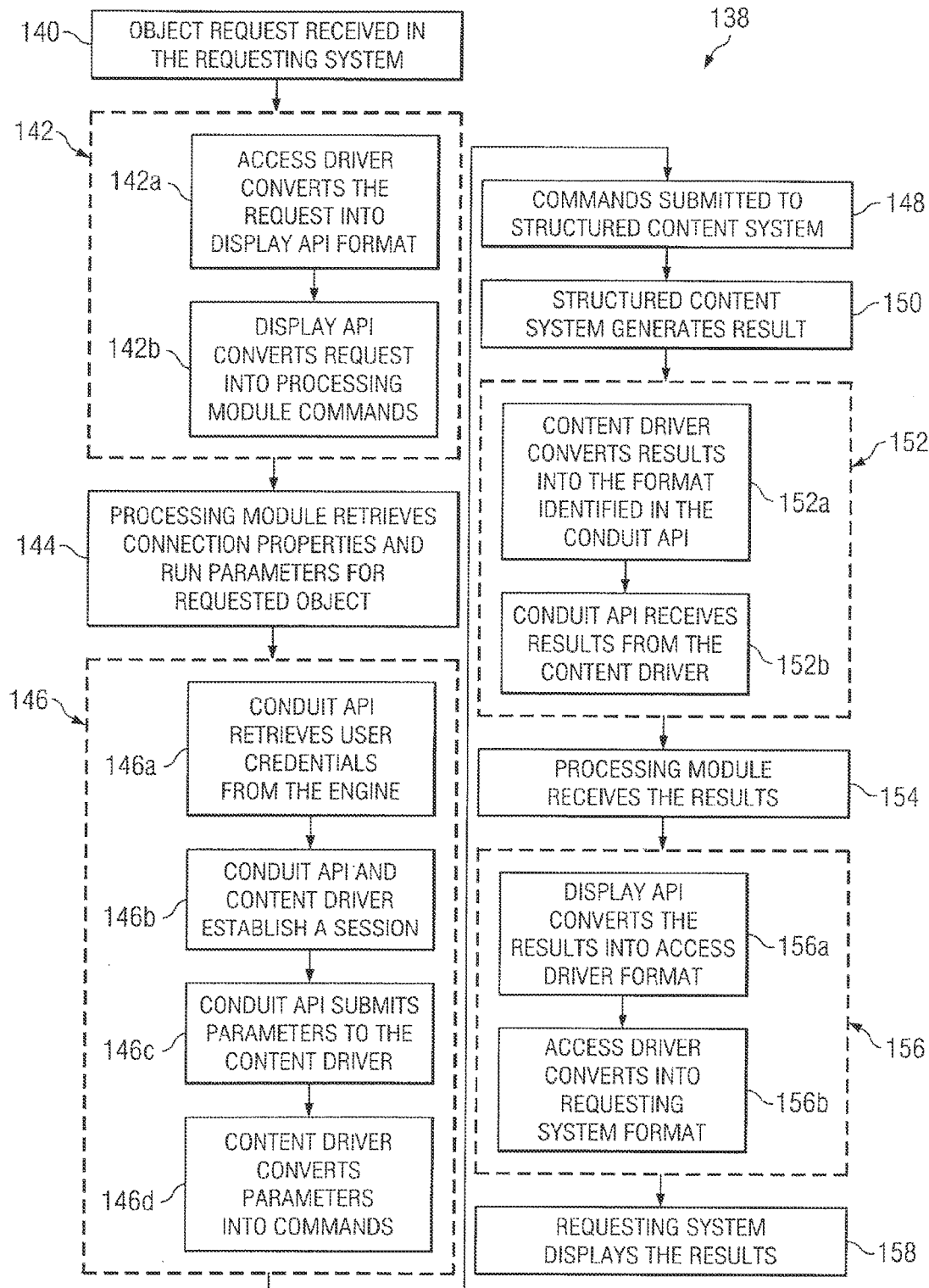
FIG. 6 is a flowchart illustrating the operation of an embodiment of the invention to access structured content.

Referring now to FIG. 6, an example 138 of the operation of an embodiment of the invention for accessing structured content is shown. At step 140, a user requests structured content in the system display. At step 142, the structured content request from the user is converted into commands to be executed by the processing module. In this embodiment, the request conversion is executed by an access driver in communication with a display API. At step 142a, an access driver in communication with the requesting system converts the access request into the conventions for a display API. In step 142b, the display API creates a series of commands based on the request and sends those commands to the processing module. It is understood that other methods of converting the request into commands for the processing module could be used. In other embodiments, the requesting system could communicate directly with the processing module, with no conversion required.

At step 144, the processing module, based on the commands received, communicates with the metadata repository to retrieve connection properties, the system access parameters, and object parameters for the requested object. In another embodiment, the processing module may check for a valid metadata object cache for the specified object. If no such cache exists, the processing module may connect to the metadata repository and retrieve the object parameters from the metadata repository to generate a cache. In a further embodiment, the processing module may check if there is a valid result cache for the specified object. If there were a result cache for the specified object, the processing module need not communicate with the structured content system, and could proceed to step 156, otherwise the method would proceed to step 146.

At step 146, the connection properties, system access parameters, and object parameters are converted into commands to be executed by a structured content system. In this embodiment, this conversion commences at step 146a, where a conduit API retrieves system access parameters for accessing a structured content system from the processing module. At step 146b, the conduit API requests a communication session with a structured content driver in communication with the structured content system. At step 146c, the conduit API submits a request containing the system access parameters and connection properties to the structured content driver. At step 146d, the structured content driver converts the system access parameters and connection properties into a set of commands that conform to the conventions of the structured content system. It is understood that other methods of converting the properties and parameters for the structured content system could be used. In other embodiments, the processing module could communicate directly with the structured content system, with no conversion required.

At step 148, the converted commands are submitted to the structured content system. At step 150, the structured content system performs the commands and generates the results. At step 152, the results are converted and sent to the processing module. In this embodiment, at step 152a, the structured content driver converts the results into the format required by the conduit API. At step 152b, the conduit API receives the results from the structured content driver and sends those results to the processing module. At step 154, the processing module receives the results (e.g. a report).

At step 156, the results are converted into the conventions for the requesting system. In this embodiment, at step 156a, the results are converted by the display API into a format usable by the access driver. At step 156*b*, the access driver converts the results into the convention used by the requesting system. At step 158, the requesting system displays the results of the navigation request.

In one embodiment, a user might use a requesting system, and when the user logs in via the requesting system, the user name and password are sent to the access driver. The access driver converts the user name and password into the user name and password convention used by the display API. The display API passes the modified user name and password to the processing module. The processing module requests user privilege information from the metadata repository. In this particular example, the user has administrator access. The user then generates a folder (or directory) and names it "Financial Reports". The user then requests the financial report from a software package that provides business intelligence functionality (e.g., a report on the company's budget trends over the past five years). The processing module accesses the metadata repository to determine which structured content system contains the requested report and the necessary connection and communication parameters to retrieve the report from the appropriate structured content system. The processing module sends those parameters to the conduit API. The conduit API executes the appropriate function call to request a report, which in this example is "GetReport( )". The GetReport( ) function call sends the parameters to the content driver, which converts the GetReport( ) function call into the function call understood by the business intelligence system that contains the requested report. In this example, that business intelligence system uses the function call "GenerateResults( )". The content driver sends the parameters to the business intelligence system, which then processes the GenerateResults( ) function call with the passed parameters. That results in the business intelligence system creating the requested report (e.g., "5 Year Budget Trend").

The generated report is sent to the content driver. The content driver passes the report output to the conduit API using, for example, a "ReceiveReport( )" function call. The conduit API then passes the report to the processing module. The processing module places a pointer to the report into the metadata repository under the folder for "Financial Reports." The processing module may also place a pointer to the report into the result cache. The report is then to the display API, which converts the report into the convention used by the access driver. The access driver then provides the report to the requesting system, which may display the "5 Year Budget Trend" report to the user.

Figure 7:
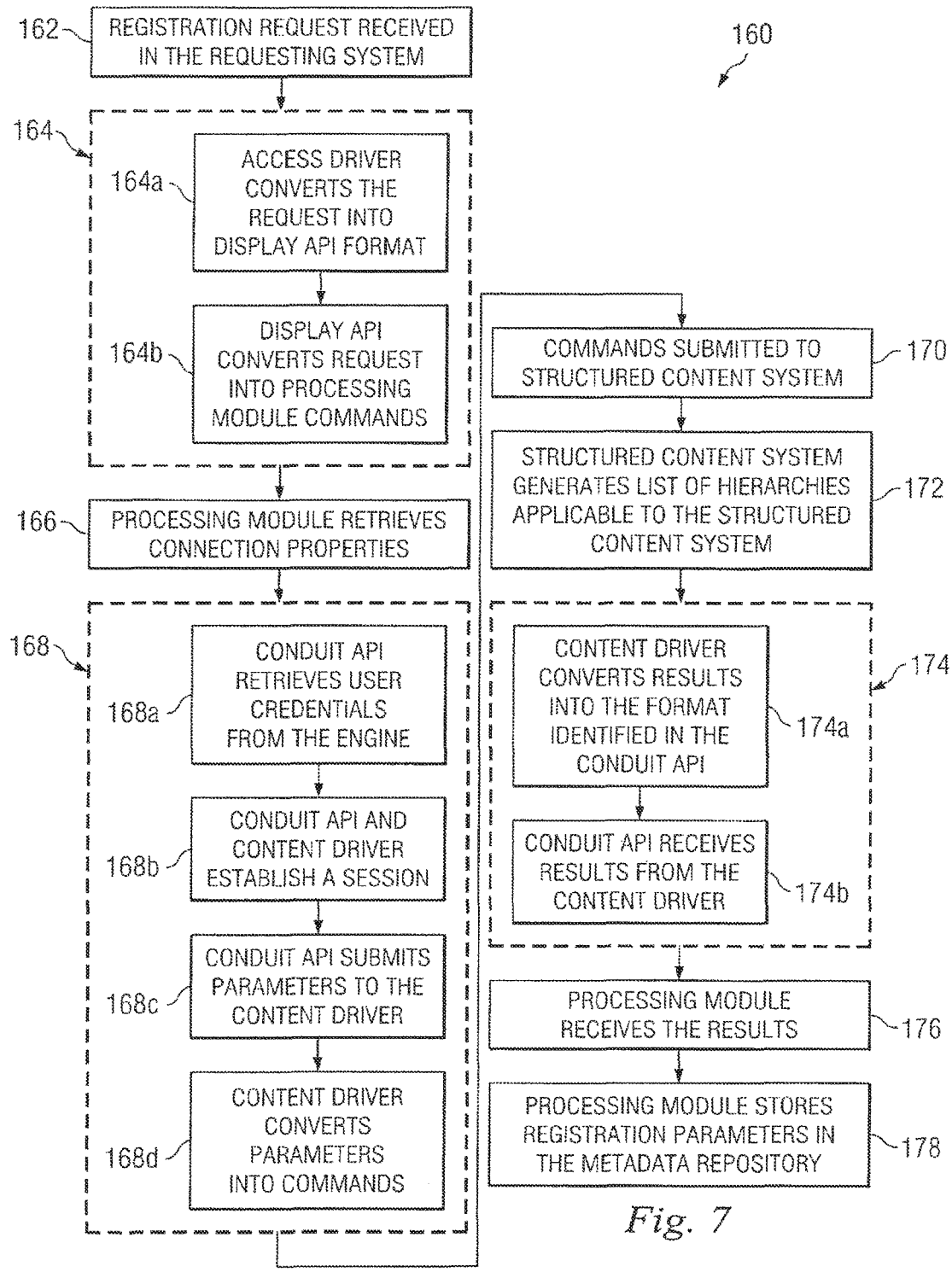
FIG. 7 is a flowchart illustrating the operation of an embodiment of the invention for registering structured content.

Referring now to FIG. 7, an example 160 of the operation of an embodiment of the invention for registering a structured content system is shown. In this embodiment, a structured content system is registered retrieving data elements, metrics, and hierarchy information for a structured content system. Some example data elements might be: a structured content system and/or structured content in that structured content system (e.g. "Report A") contains data elements for Year, Month, Region, Territory, Product Category, item SKU. Some example metric information might be: structured content system and/or structured content in that structured content system (e.g. "Report A") contains metrics for Total Sales, New Sales, Total Inventory, and Customer Count. An example of hierarchy information might be: a structured content system and/or structured content in that structured content system (e.g. "Report A") contains a relationship where Year is a parent of Month (e.g., the year 1999 has the month January-1999 as one of its elements), Region is a parent of Territory, and Product Category is a parent of Item SKU.

In operation, at step 162, a user makes a registration request in the system display. At step 164, the structured content request from the user is converted into commands to be executed by the processing module. In this embodiment, the conversion is executed by an access driver in communication with a display API. At step 164*a*, an access driver in communication with the requesting system converts the registration request into the conventions for a display API. In step 164*b*, the display API creates a series of commands based on the request and sends those commands to the processing module. It is understood that other methods of converting the request into commands for the processing module could be used. In other embodiments, the requesting system could communicate directly with the processing module, with no conversion required.

At step 166, the processing module, based on the commands received, communicates with the metadata repository to retrieve the connection properties and system access parameters for the structured content system referenced in the commands. At step 168, the connection properties are converted into commands to be executed by a structured content system in order to request the structured content driver to retrieve a list of available data elements, measures, and hierarchies. In this embodiment, this operation commences at step 168*a*, where a conduit API retrieves system access parameters for accessing a structured content system from the processing module. At step 168*b*, the conduit API requests a communication session with a structured content driver in communication with the structured content system. At step 168*c*, the conduit API submits a request to the structured content driver to retrieve a list of available data elements, measures, and hierarchies. At step 168*d*, the structured content driver converts the system access parameters and connection properties into a set of commands that conform to the conventions of the structured content system. It is understood that other methods of converting the properties and parameters for the structured content system could be used. In other embodiments, the processing module could communicate directly with the structured content system, with no conversion required.

At step 170, the converted commands are submitted to the structured content system. At step 172, the structured content system performs the commands and generates a list of data elements, metrics, and hierarchies for the structured content system and the structured content objects within the structured content system. At step 174, the results (e.g. the list of data elements, metrics, and hierarchies) are converted and sent to the processing module. In this embodiment, at step 174*a*, the structured content driver converts the results into the format required by the conduit API. At step 174*b*, the conduit API receives the results from the structured content driver and sends those results to the processing module. At step 176, the processing module receives the results.

At step 178, the processing module receives the results and writes the parameters to the metadata repository for the selected structured content system and/or structured content object. When the parameters are associated with a specific structured content system, it is stored in the metadata repository that these parameters are associated with that structured content system. When the parameters are associated with a specific structured content object, it is stored in the metadata repository that these parameters are associated with that structured content object. This allows subsequent processes to identify the granularity that a report contains (e.g., whether a report has month-item-sales, or year-item-sales).

Figure 8:
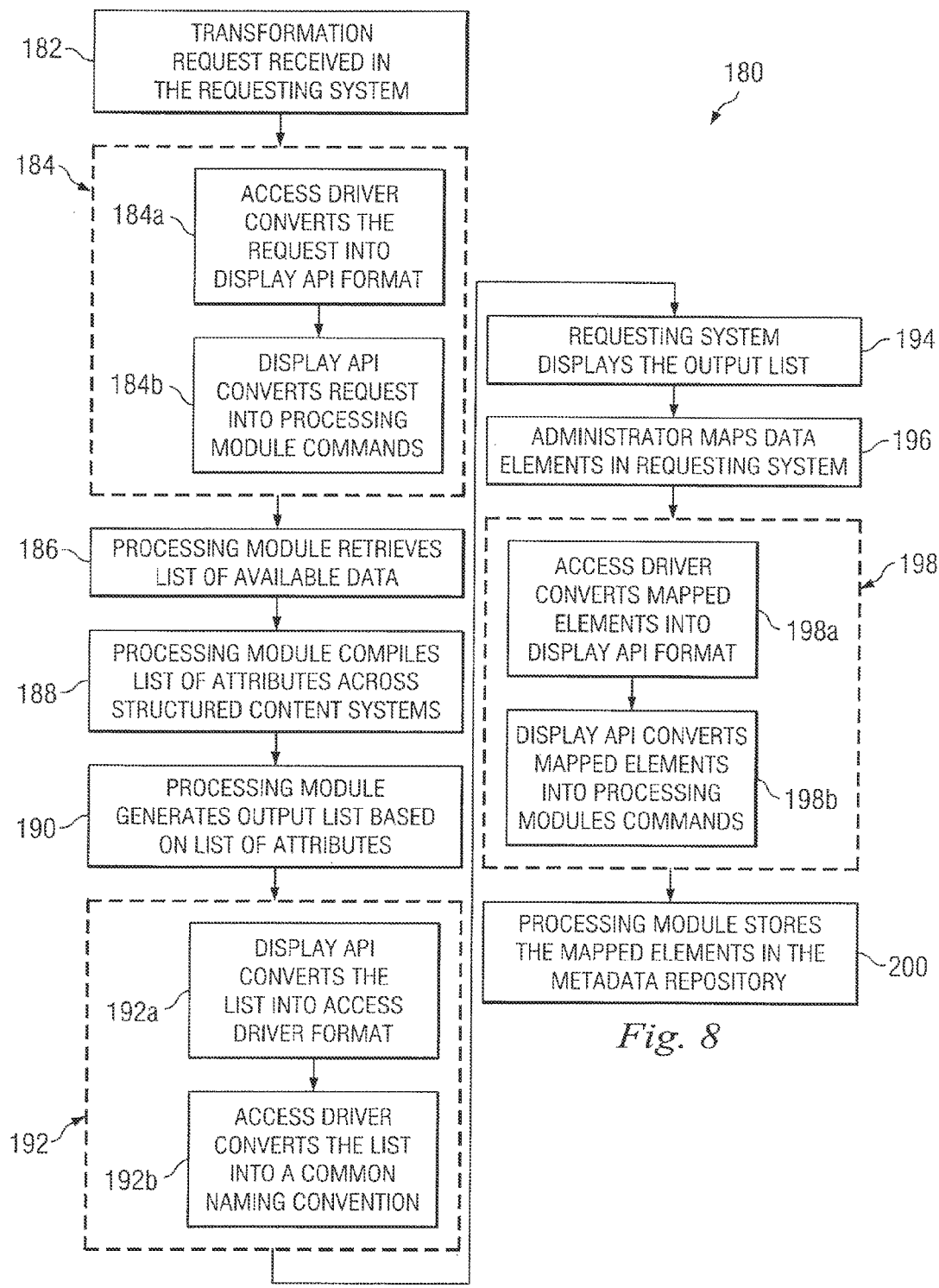
FIG. 8 is a flowchart illustrating the operation of an embodiment of the invention for mapping data elements into a transformation index.

Referring now to FIG. 8, an example 180 of the operation of an embodiment of the invention for transforming structured content is shown. Transforming structured content generates a nomenclature that allows common data elements across the various systems to be referenced. For example, "yr" may be used in one system, "y" in another and both of these are referred to as "year" within the processing module. At step 182, a user makes a transformation request in the requesting system. At step 184, the transformation request from the user is converted into commands to be executed by the processing module. In this embodiment, the conversion is executed by an access driver in communication with a display API. At step 184a, an access driver in communication with the requesting system converts the transformation request into the conventions for a display API. In step 184b, the display API creates a series of commands based on the request and sends those commands to the processing module. It is understood that other methods of converting the request into commands for the processing module could be used. In other embodiments, the requesting system could communicate directly with the processing module, with no conversion required.

At step 186, the processing module, based on the commands received, communicates with the metadata repository to retrieve a list of available data elements for the structured content referenced in the commands. Some examples of categories are "year" and "region." At step 188, the processing module compiles a list of data elements across the structured content system based on the retrieved results of step 186. At step 190, the processing module generates an output list based on the list of data elements.

At 192, the output list is converted into the conventions for the requesting system. In this embodiment, at step 192a, the output list is converted by the display API into a format usable by the access driver. At step 192b, the access driver converts the output list into the convention used by the requesting system. At step 194, the requesting system displays the output list.

At step 196, the user cross-references the data elements associated with multiple structured content systems to each other and those data elements are mapped to a common naming convention. For example, "Y" in one structured system is mapped to "Yr" in a second structured content system and both are cross-referenced to "Year" for use by the processing module. In one embodiment, a rule may be applied to normalize characteristics between data elements from different structured content systems. For example, a rule may be applied to normalize "Fiscal Year" in a first structured content system to "Calendar Year" in a second structured content system, by subtracting a month from the second structured content system. At step 198, the mapped elements are converted into commands to be executed by the processing module. In this embodiment, the conversion is executed by an access driver in communication with a display API. At step 198a, an access driver in communication with the requesting system converts the mapped elements into the conventions for the display API. In step 198b, the display API creates a series of commands based on the mapped elements and sends those commands to the processing module. It is understood that other methods of converting the request into commands for the processing module could be used. In other embodiments, the requesting system could communicate directly with the processing module, with no conversion required.

At step 200, the processing module stores the mapped elements in the metadata repository.

Referring now to FIG. 9, an example 202 of the operation of an embodiment of the invention for creating hierarchies is shown. At step 204, a user makes a hierarchy creation request in the requesting system. At step 206, the create hierarchy request from the user is converted into commands to be executed by the processing module. In this embodiment, the conversion is executed by an access driver in communication with a display API. At step 206a, an access driver in communication with the requesting system converts the navigation request into the conventions for a display API. In step 206b, the display API creates a series of commands based on the request and sends those commands to the processing module. It is understood that other methods of converting the request into commands for the processing module could be used. In other embodiments, the requesting system could communicate directly with the processing module, with no conversion required.

At step 208, the processing module, based on the commands received, communicates with the metadata repository to retrieve a list of available data elements for the structured content system(s) referenced in the commands. Some examples of data elements are "year" and "region."

At step 210, the processing module connects to the metadata repository and retrieves a list of hierarchies. This list of hierarchies applies to the data elements retrieved in step 208. As an example, a first structured content system has both year and month data elements defined to it. In this instance, the list of hierarchies would show that in the first structured content system a year is a parent of month (e.g., the month, "January-1999" is one of many elements in the year 1999). At step 212, the processing module retrieves the transformation map index from the metadata repository. The transformation map index indicates the nomenclature used by individual structured content systems. For example, "Y" in system 1 equates to "Year" for the processing module.

At step 214, the processing module compiles a list of data elements and existing hierarchies across the systems using the nomenclature as defined in the transformation index. At step 216, the processing module generates an output list based on the compiled list of attributes and hierarchies.

At 218, the output list is converted into the display conventions for the requesting system. In this embodiment, the conversion is executed by a display API and access driver in communication with the display API. At step 218a, the output list is converted by the display API into a format usable by the access driver. At step 218b, the access driver converts the output list into the convention used by the requesting system. At step 220, the requesting system displays the output list for the user.

At step 222, the user may edit the existing hierarchies and create new hierarchies across structured content systems through the display system. At step 224, the new hierarchies are converted into commands to be executed by the processing module. In this embodiment, the conversion is executed by an access driver in communication with the display API. At step 224a, an access driver in communication with the requesting system converts the new hierarchies into the conventions for a display API. In step 224b, the display API creates a series of commands based on the new hierarchies and sends those commands to the processing module. It is understood that other methods of converting the hierarchies into commands for the processing module could be used. In other embodiments, the requesting system could communicate directly with the processing module, with no conversion required.

At step 226, the processing module connects to and stores the new hierarchies in the metadata repository.

Figure 10A:
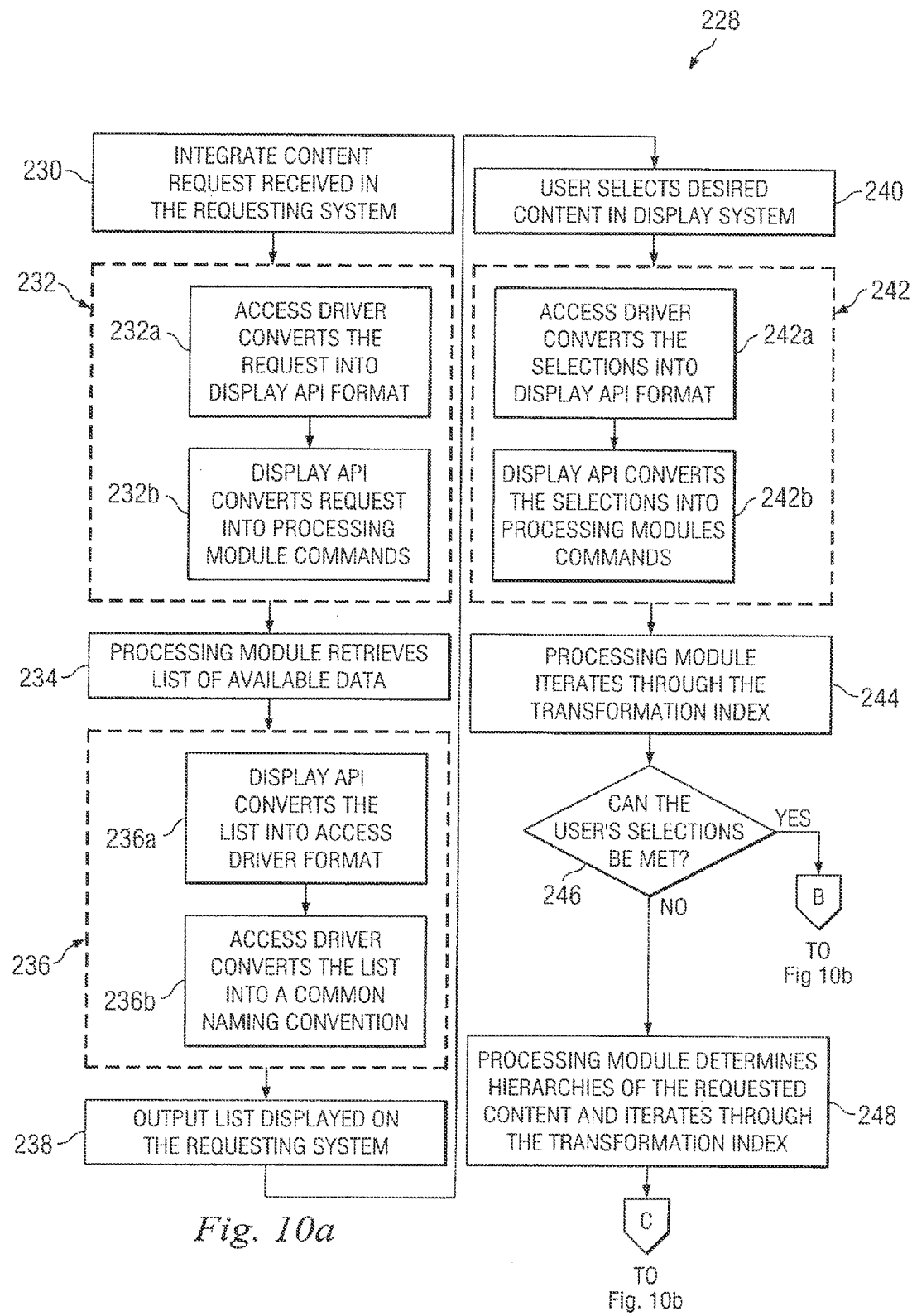
FIG. 10 is a flowchart illustrating the operation of an embodiment of the invention for integrating structured content.
Figure 10B:
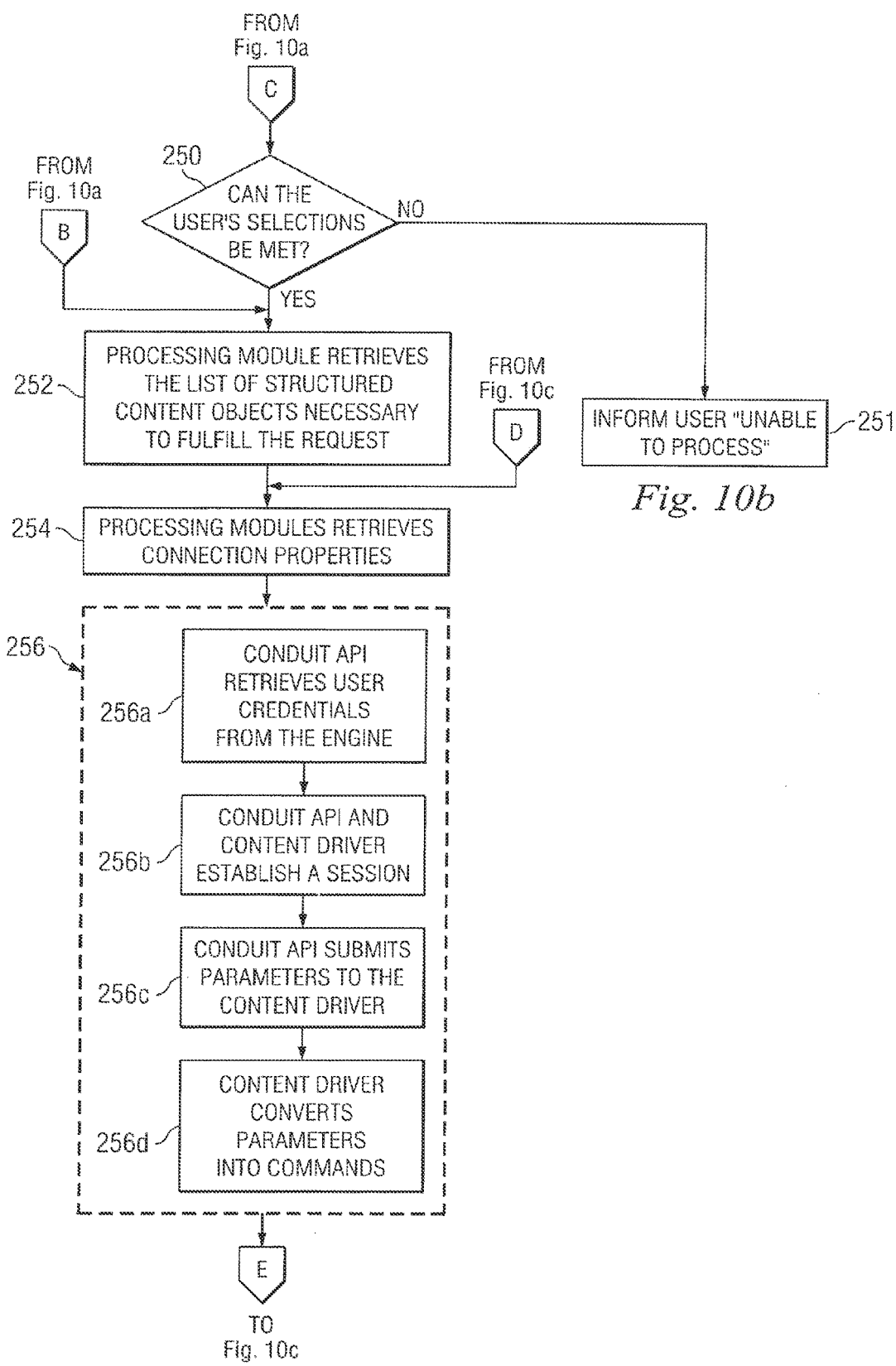
Figure 10C:
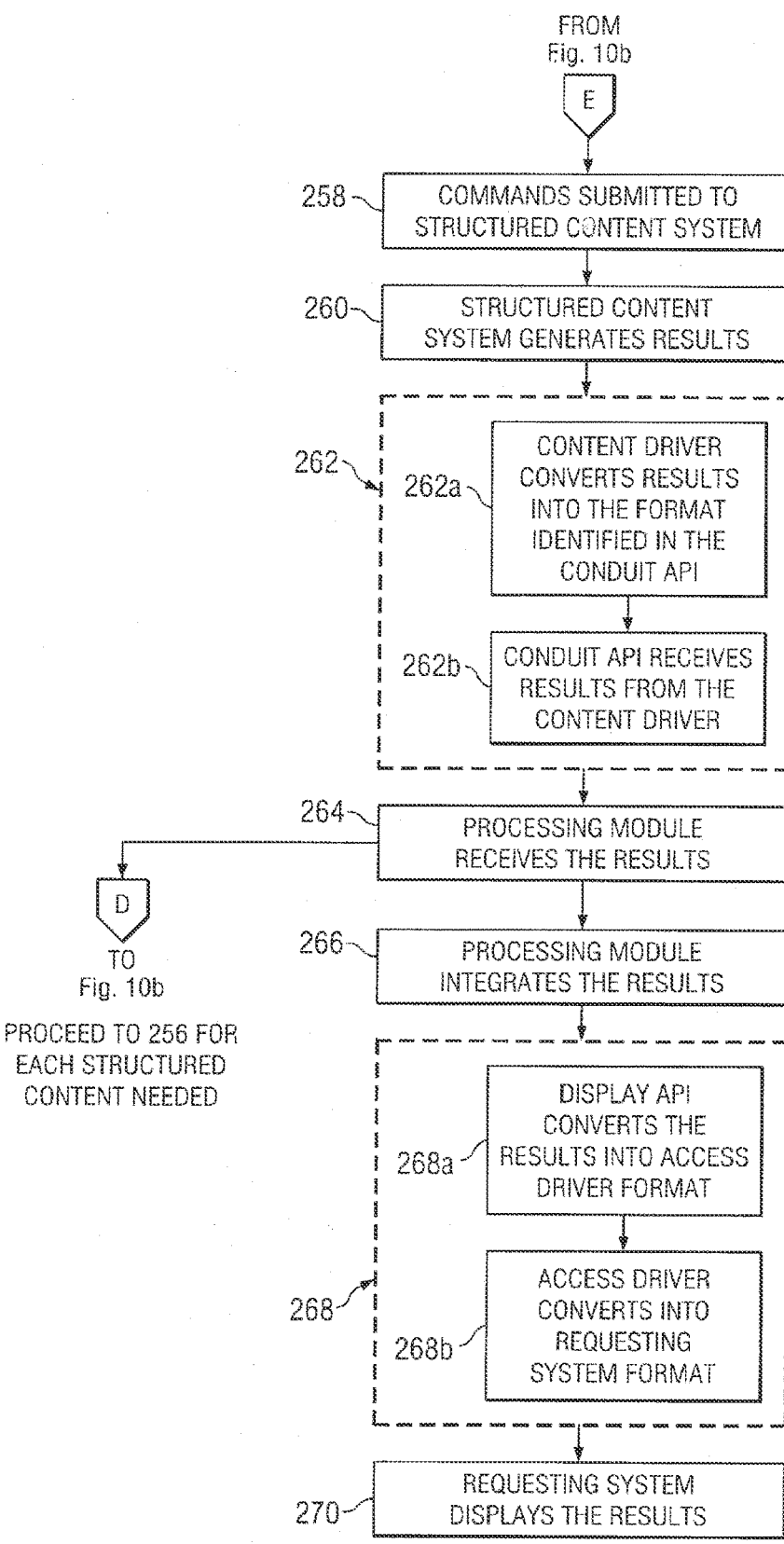

Referring now to FIG. 10, an example 228 of the operation of an embodiment of the invention for integrating structured content is shown. This allows a user to create unions between multiple information sources, apply formulas, rules, and mathematical functions to information sources, to conduct advanced searches across multiple data sources, create cross-application hierarchies and drill paths, and to generate balanced scorecards. An example use for this embodiment involves a first structured content system that contains a sales report involving the attributes "year," "geographic region," and "sales," and a second structured content system that contains a sales report involving the attributes "month," "geographic region," and "inventory." By merging these two results, the new integrated structured content object would contain "year," "geographic region," "sales," and "inventory." This process may not only involve identifying the commonality of data elements, but also relationships between data elements. The processing module would identify that "month" in the second structured content system may be aggregated to produce a "year" value for "inventory". Once this is accomplished, the result may be merged with the output from the first structured content system to produce the desired output.

At step 230, a user makes an integrated structured content creation request in the display environment (e.g. create a sales report). At step 232, the integrated structured content creation request is converted into commands to be executed by the processing module. In this embodiment, the conversion is executed by an access driver in communication with a display API. At step 232*a*, an access driver in communication with the requesting system converts the navigation request into the conventions for a display API. In step 232*b*, the display API creates a series of commands based on the request and sends those commands to the processing module. It is understood that other methods of converting the request into commands for the processing module could be used. In other embodiments, the requesting system could communicate directly with the processing module, with no conversion required.

At step 234, the processing module connects to the metadata repository and retrieves a list of available data elements and metrics. At 236, the list is converted into the conventions for the requesting system. In this embodiment, the conversion is executed by a display APT and access driver in communication with the display API. At step 236*a*, the list is converted by the display API into a format usable by the access driver. At step 236*b*, the access driver converts the list into the convention used by the requesting system. At step 238, the requesting system displays the list.

At step 240, the user selects the attributes and categories for inclusion in the integrated structured content (e.g., a report covering "year," "geographic region," "inventory," and "sales"). At step 242, the selected attributes and categories are converted into commands to be executed by the processing module. In this embodiment, the conversion is executed by an access driver in communication with a display API. At step 242*a*, an access driver in communication with the requesting system converts the navigation request into the conventions for a display API. In step 242*b*, the display API creates a series of commands based on the request and sends those commands to the processing module. It is understood that other methods of converting the request into commands for the processing module could be used. In other embodiments, the requesting system could communicate directly with the processing module, with no conversion required.

At step 244, the processing module connects to the metadata repository and iterates through the transformation index and determines which structured content objects may satisfy the selections made by the user. At step 246, the processing module determines whether the user's selections are met by a single structured content object or multiple structured objects, based on the results of the iteration through the transformation. If the object or objects can meet the user's selections, the method proceeds to step 252. If the user's selections cannot be met by a single structured content object or a multiple structured object, then method proceeds to step 248.

At step 248, the processing module determines the applicable hierarchies of the user's selection and iterates through the transformation index to determine which structured content objects may satisfy the hierarchies applicable to the user's selection (e.g. a first structured content system may contain "month", "geographic region", "sales", and "inventory", but months have been mapped to correspond to "year" within that system). At step 250, the processing module, on the basis of the iteration through the transformation index, determines whether a single structured content object or multiple structured content objects can satisfy the user's selection. If so, the system proceeds to step 252. If no, the system proceeds to step 270. At step 270, the system informs the user that the integration request cannot be performed.

At step 252, the processing module retrieves a list of structured content objects necessary to complete the request from the processing module. These will later be used as a template to integrate the structured content within the processing module. At step 254, the processing module retrieves the connection properties and access parameters from the metadata repository necessary to retrieve the structured content objects identified in step 252. At step 256, the processing module execution command is converted into commands to be executed by a single structured content system in order to request the structured content driver to retrieve the applicable structured content. In this embodiment, this operation commences at step 256*a*, where a conduit API retrieves system access parameters for accessing a structured content system from the processing module. At step 256*b*, the conduit API requests a communication session with a structured content driver in communication with the structured content system. At step 256*c*, the conduit API submits a request containing the system access parameters and connection properties to a single structured content driver. At step 256*d*, the structured content driver converts the system access parameters and connection properties into a set of commands that conform to the conventions of the structured content system. It is understood that other methods of converting the properties and parameters for the structured content system could be used. In other embodiments, the processing module could communicate directly with the structured content system, with no conversion required.

At step 258, the converted commands are submitted to the structured content system. At step 260, the structured content system performs the commands and generates the results. At step 262, the results are converted and sent to the processing module. In this embodiment, at step 262*a*, the structured content driver converts the results into the format required by the conduit API. At step 262*b*, the conduit API receives the results from the structured content driver and sends those results to the processing module. At step 264, the processing module receives the results, and, if additional structured content objects are required, the method returns to step 256 as needed.

At step 266, the processing module creates the integrated structured content by combining the results from the structured content objects, based on the hierarchies and transformation index.

At 268, the integrated results are converted into the conventions for the requesting system. In this embodiment, the conversion is executed by a display API and access driver in communication with the display API. At step 268*a*, the list is converted by the display API into a format usable by the access driver. At step 268*b*, the access driver converts the list into the convention used by the requesting system. At step 270, the requesting system displays the list.

For any of the foregoing, a plurality of remote accessing systems may be used to submit the identified requests, whether the requests are automated or from a user. For example, the functionality described may be accessed from a corporate portal or a custom application.

In some embodiments of the invention, the results of any request with respect to the structured content systems are returned in a parseable format, such as XML. In this embodiment, the processing module parses the incoming report and is able to aggregate and manipulate the content of the structured content to generate new structured content.

In an additional embodiment, a report may be created by a requesting system, and using the techniques described herein, the report may be inserted into a structured content system.

While the invention has been particularly shown and described with reference to the preferred embodiment thereof, it will be understood by those skilled in the art that various changes in form and detail may be made therein without departing from the spirit and scope of the invention.

What is claimed is:

1. A method for aggregating structured content, comprising:
   accessing at least one of a plurality of structured content systems using a conversion module;
   selecting a structured content object contained in the at least one of the plurality of structured content systems;
   retrieving parameters that define the selected structured content object; and
   storing the parameters in a metadata repository.

2. The method of claim 1, further comprising:
   retrieving system access parameters for accessing the at least one of the plurality of structured content systems.

3. The method of claim 1, further comprising:
   receiving navigation commands from a requesting system; and
   navigating at least one of the plurality of structured content systems based on the navigation commands.

4. The method of claim 1, further comprising:
   repeating each of the foregoing for a plurality of structured content contained in the plurality of structured content systems.

5. The method of claim 1, further comprising:
   retrieving parameters that define unstructured content;
   storing parameters with respect to unstructured content in the metadata repository.

6. The method of claim 5, wherein the storing parameters with respect to unstructured content stores system access parameters for accessing unstructured content contained in an unstructured content management system.

7. The method of claim 1, further comprising:
   dynamically updating the parameters in the metadata repository when structured content is created in one of the plurality of the structured content systems.

8. The method of claim 1, further comprising:
   dynamically updating the parameters in the metadata repository when structured content is modified in one of the plurality of the structured content systems.

9. The method of claim 1, further comprising: searching the structured content parameters in the metadata repository.

10. A method for aggregating structured content, comprising:
    receiving navigation commands from a requesting system;
    retrieving system access parameters for accessing at least one of the plurality of structured content systems;
    navigating at least one of the plurality of structured content systems based on the navigation commands;
    accessing one of a plurality of structured content systems using a conversion module; selecting a structured content object contained in at least one of the plurality of structured content systems;
    retrieving parameters that define the selected structured content object;
    storing the parameters in a metadata repository; and
    repeating each of the foregoing for a plurality of structured content objects contained in the plurality of structured content systems.

* * * * *